(12) United States Patent
Wang et al.

(10) Patent No.: US 7,864,463 B2
(45) Date of Patent: Jan. 4, 2011

(54) THIN FASTENING SLICE MODULE

(75) Inventors: Ching-Chung Wang, Taipei (TW); Chen-Ning Hsi, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 12/535,875

(22) Filed: Aug. 5, 2009

(65) Prior Publication Data
US 2010/0290139 A1    Nov. 18, 2010

(30) Foreign Application Priority Data
May 15, 2009 (TW) .............................. 98116108 A

(51) Int. Cl.
  *G02B 7/02* (2006.01)
(52) U.S. Cl. ...................... 359/827; 359/819
(58) Field of Classification Search ................. 359/827, 359/819
See application file for complete search history.

(56) References Cited

U.S. PATENT DOCUMENTS 4,468,102 A * 8/1984 Chikano ...................... 359/612
2003/0227771 A1 * 12/2003 Hunter ........................ 362/85
2009/0122150 A1 * 5/2009 Shabtay et al. ........... 348/222.1

* cited by examiner

*Primary Examiner*—Jordan M. Schwartz
*Assistant Examiner*—James C Jones
(74) *Attorney, Agent, or Firm*—Kirton & McConkie; Evan R. Witt

(57) ABSTRACT

A thin fastening slice module includes a first fastening slice body and a second fastening slice body. The first fastening slice body includes a first surface, a first upper periphery and a first concave part. The first concave part is downwardly extended from the first upper periphery. The second fastening slice body includes a second surface, a second upper periphery and a second concave part. The second concave part is downwardly extended from the second upper periphery. The first surface has an area greater than the second surface. The first upper periphery is aligned with the second upper periphery. The second fastening slice body is connected to a front end of an image pickup device. The first fastening slice body is separated from the image pickup device. A recess structure is defined between the first fastening slice body, the second fastening slice body and said image pickup device.

10 Claims, 5 Drawing Sheets

THIN FASTENING SLICE MODULE

FIELD OF THE INVENTION

The present invention relates to a fastening slice module, and more particularly to a thin fastening slice module for fastening an external lens onto an image pickup device.

BACKGROUND OF THE INVENTION

Recently, most notebook computers have built-in image pickup devices for taking photographs or holding video conferences. With increasing development of digital techniques, text documents are gradually created as electronic files. Generally, text documents are scanned by scanning apparatuses and then saved as electronic files such as PDF (Portable Document Format) files. In a case that no scanning apparatus is connected to the notebook computer, the images of simple documents such as single-sided papers or business cards could be captured by the built-in image pickup device. The images captured by the built-in image pickup device are usually saved as JPEG (Joint Photographic Experts Group) files. Most users prefer using scanning apparatuses to scan the text documents as PDF files because the texts and signs contained in the PDF files are readable by the computer systems and could be converted as editable text files.

As known, optical character recognition (OCR) is a process of capturing an image of a document and then extracting the texts from that image. Recently, it is possible to analyze images that are captured from the image pickup device by the OCR technique and saved as JPEG files. As a consequence, individual texts or signs contained in the JPEG files are recognized and converted as editable text files. Since the associated OCR techniques are well established, the image pickup device is gradually adopted to obtain electronic files of the documents.

When an image pickup device of a notebook computer is used to capture the image of a document, some difficulties possibly occur. For example, the image pickup device of a typical notebook computer has a focal length of approximately 60 centimeters. If the distance between the image pickup device and the document is shorter than the preset focal length (i.e. 60 centimeters), the obtained image of the document is usually blurred and thus fails to be recognized by the naked eyes.

For using the image pickup device to obtain a sharp image of the document, an external lens is arranged in front of the image pickup device. The use of the external lens could shorten the preset focal length of the image pickup device in order to capture the image of the nearby document. An example of the external lens is a close-up lens. For mounting the close-up lens in the front of the image pickup device, a fastening device is necessary for connecting the close-up lens with the image pickup device.

FIG. 1 is a schematic side view illustrating a notebook computer having a fastening device according to the prior art. As shown in FIG. 1, the notebook computer 1 comprises a base 10 and an upper cover 11. A keyboard 101 is mounted on the base 10. Via the keyboard 101, the user may input characters or signs. The upper cover 11 comprises a screen 111 and an image pickup device 112. The image pickup device 112 is disposed on an upper edge of the upper cover 11 for capturing an image of a document. The screen 111 is used for showing the operating conditions of the notebook computer 1. In a case that an image is captured by the image pickup device 112, the image is shown on the screen 111. As shown in FIG. 1, the fastening device 12 comprises a hooking element 121, which is attached onto the upper cover 11 of the notebook computer 1. After the hooking element 121 is attached onto the upper cover 11, the fastening device 12 is connected with the notebook computer 1. Since the external lens 13 is connected with the fastening device 12, the external lens 13 will be arranged in front of the image pickup device 112.

Since the fastening device 12 is made of plastic material and has a specified configuration (e.g. the configuration of a hooking element or a clamping element), the process of making the mold of the fastening device 12 is complicated and not cost-effective. Moreover, in a case that the notebook computer is used in other places, the user should additionally carry the fastening device 12 in order to perform the image-capturing operation. In other words, it is very troublesome to simultaneously carry the notebook computer and the fastening device 12.

SUMMARY OF THE INVENTION

It is an object of the present invention to provide a thin fastening slice module, which is portable and has a simplified configuration.

Another object of the present invention provides a cost-effective thin fastening slice module.

In accordance with an aspect of the present invention, there is provided a thin fastening slice module connected to a front end of an image pickup device for fastening an external lens. The thin fastening slice module includes a first fastening slice body and a second fastening slice body. The first fastening slice body includes a first surface, a first upper periphery and a first concave part. The first concave part is downwardly extended from the first upper periphery. The second fastening slice body includes a second surface, a second upper periphery and a second concave part. The second concave part is downwardly extended from the second upper periphery. The first surface has an area greater than the second surface. The first upper periphery is aligned with the second upper periphery. The second fastening slice body is connected to the front end of the image pickup device, and the first fastening slice body is separated from the image pickup device, so that a recess structure is defined between the first fastening slice body, the second fastening slice body and the image pickup device for fastening the external lens.

In an embodiment, the external lens has a protruding edge at an outer periphery thereof, and the protruding edge is partially embedded into the recess structure, thereby fastening the external lens.

In an embodiment, the protruding edge has a shape fitted to the second concave part.

In an embodiment, the protruding edge is ring-shaped and the second concave part is semi-circular.

In an embodiment, the protruding edge and the second concave part have polygonal shapes.

In an embodiment, the first fastening slice body and the second fastening slice body have similar shapes, and the first concave part is smaller than the second concave part.

In an embodiment, the thin fastening slice module is connected with the image pickup device via an adhesive.

In an embodiment, the second fastening slice body is connected with the first fastening slice body via an adhesive.

In an embodiment, the external lens is a close-up lens for shortening a focal length of the image pickup device.

In an embodiment, the image pickup device is a web camera of a notebook computer.

In an embodiment, the notebook computer further includes a base and an upper cover. The base has a keyboard for inputting characters or signs. The upper cover has a screen for displaying an image of a document.

In an embodiment, the image pickup device is disposed on an upper edge of the upper cover.

In an embodiment, the first fastening slice body and the second fastening slice body are made of Mylar.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
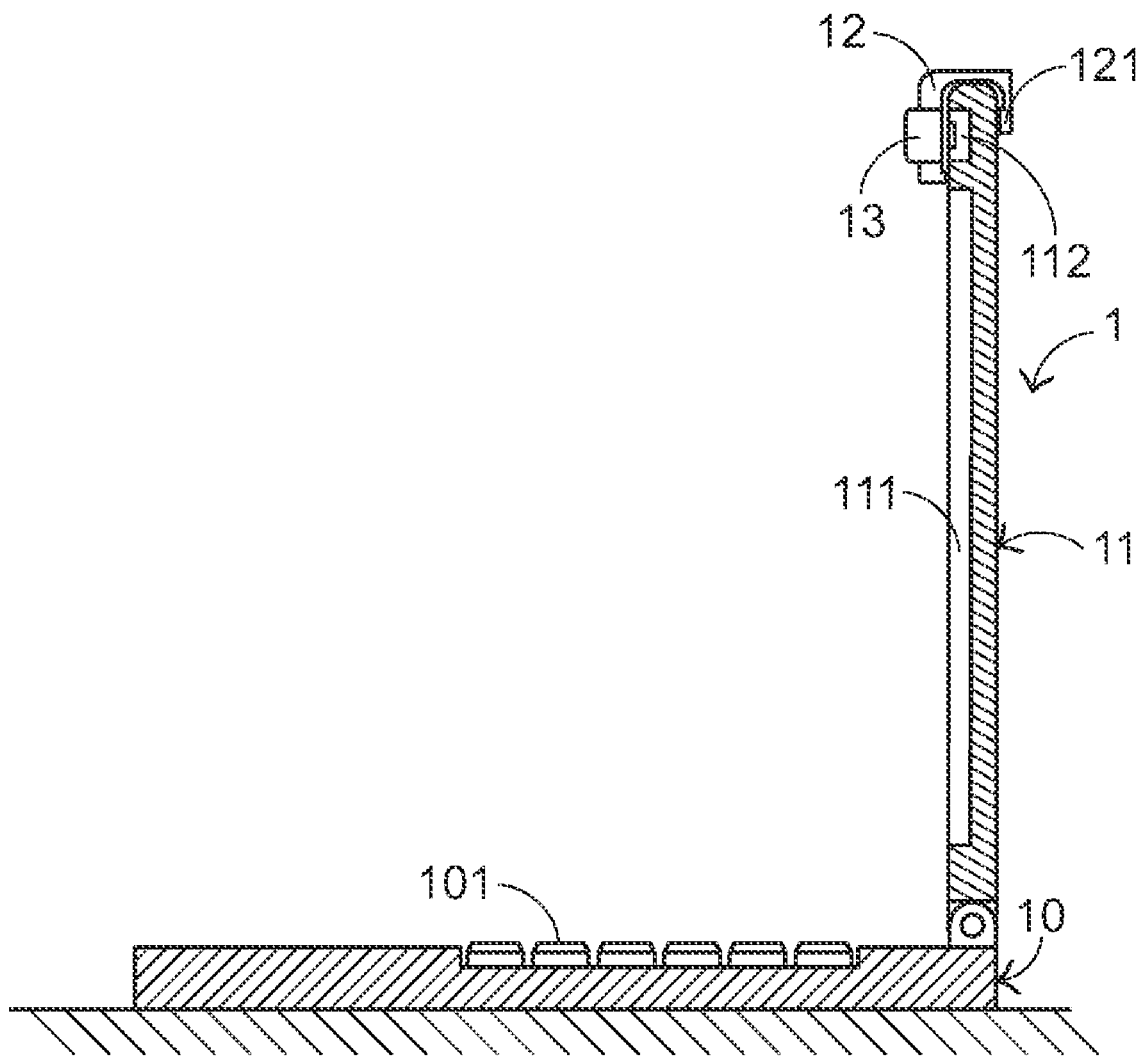
FIG. 1 is a schematic side view illustrating a notebook computer having a fastening device according to the prior art.
Figure 2:
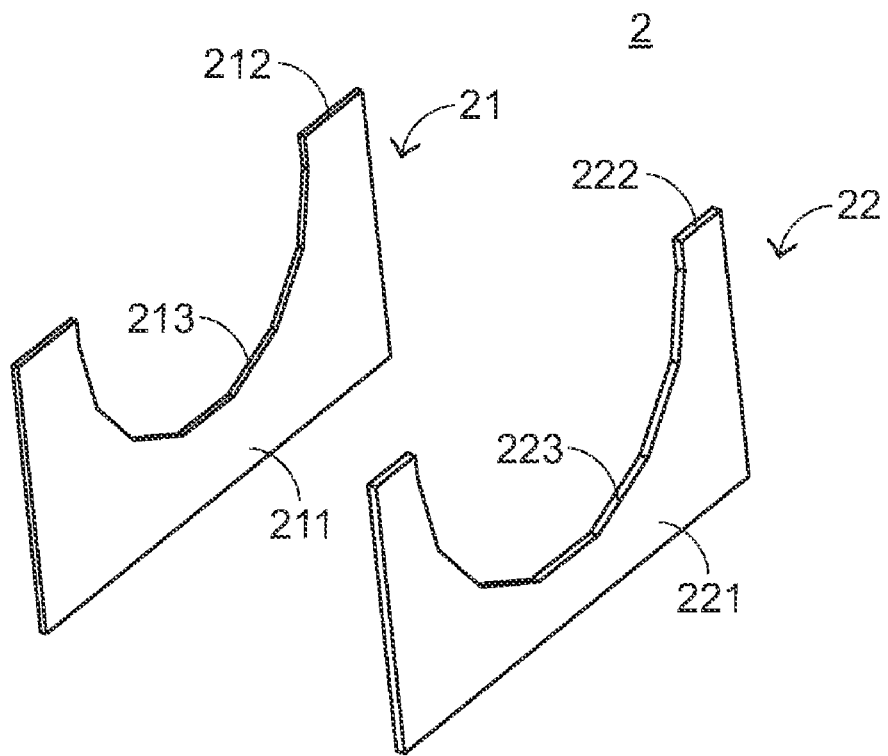
FIG. 2 is a schematic exploded view illustrating a thin fastening slice module according to an embodiment of the present invention.

The present invention provides a thin fastening slice module. The thin fastening slice module is easy to be carried. FIG. 2 is a schematic exploded view illustrating a thin fastening slice module according to an embodiment of the present invention. As shown in FIG. 2, the thin fastening slice module 2 comprises a first fastening slice body 21 and a second fastening slice body 22. The first fastening slice body 21 comprises a first surface 211, a first upper periphery 212 and a first concave part 213. The first concave part 213 is downwardly extended from the first upper periphery 212. The second fastening slice body 22 comprises a second surface 221, a second upper periphery 222 and a second concave part 223. The second concave part 223 is downwardly extended from the second upper periphery 222.

Figure 3:
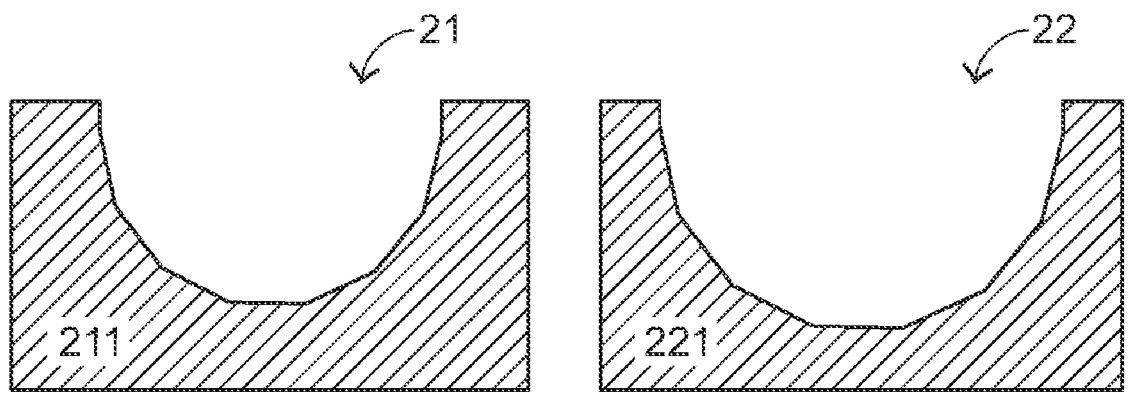
FIG. 3 is a schematic cross-sectional view illustrating the two fastening slice bodies of the thin fastening slice module according to the embodiment of the present invention.

FIG. 3 is a schematic cross-sectional view illustrating the two fastening slice bodies of the thin fastening slice module according to the embodiment of the present invention. As shown in FIG. 3, the first fastening slice body 21 and the second fastening slice body 22 have similar shapes. In addition, the first concave part 213 is smaller than the second concave part 223. For example, the first concave part 213 and the second concave part 223 have polygonal shapes. In other words, the area of the first surface 211 is greater than that of the second surface 221.

Figure 4:
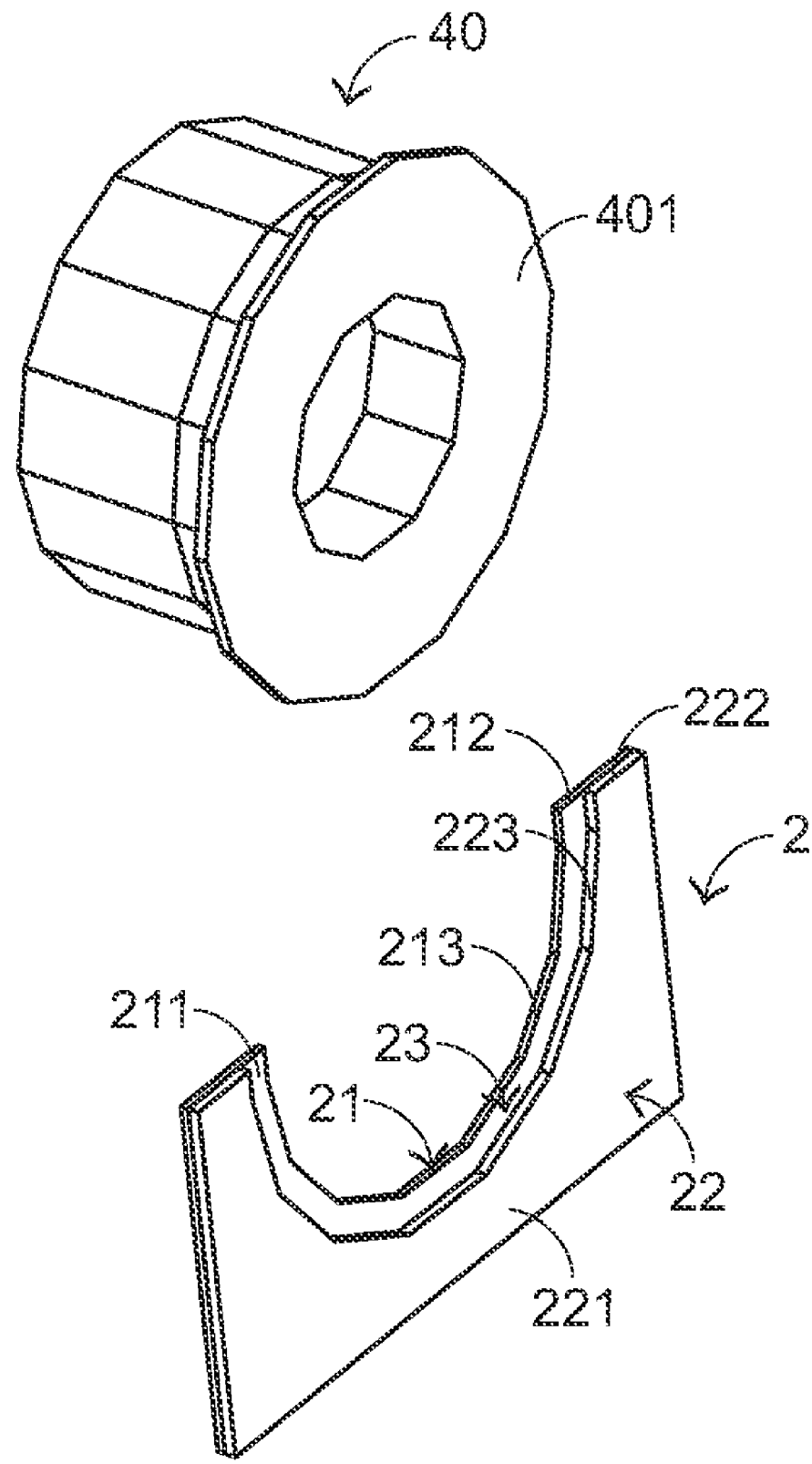
FIG. 4 is a schematic perspective view illustrating the thin fastening slice module according to the embodiment of the present invention.

FIG. 4 is a schematic perspective view illustrating the thin fastening slice module according to the embodiment of the present invention. In the thin fastening slice module 2, the first fastening slice body 21 and the second fastening slice body 22 are connected with each other, wherein the first upper periphery 212 is aligned with the second upper periphery 222. Since the area of the first surface 211 is greater than that of the second surface 221, a recess structure 23 is defined between the first concave part 213 and the second concave part 223 after the first fastening slice body 21 and the second fastening slice body 22 are combined together. As shown in FIG. 4, the recess structure 23 has a bi-directional gap. The recess structure 23 of the thin fastening slice module 2 provides the function of fastening a document to be captured. It is preferred that the first fastening slice body 21 and the second fastening slice body 22 are connected with each other via an adhesive (not shown).

Moreover, for shortening the preset focal length of an image pickup device 312 (see FIG. 5) and capturing the image of a nearby document, an external lens 40 is arranged in front of the image pickup device 312. Please refer to FIG. 4 again. The external lens 40 comprises a protruding edge 401 at the outer periphery thereof. An example of the external lens 40 is a close-up lens for shortening the preset focal length of an image pickup device 312.

In accordance with a key feature of the present invention, the shape of the protruding edge 401 of the external lens 40 is fitted with the shape of the second concave part 223. For example, the second concave part 223 and the protruding edge 401 have polygonal shapes. After the protruding edge 401 of the external lens 40 is partially embedded into the recess structure 23, the external lens 40 is fixed by the thin fastening slice module 2.

It is noted that, however, those skilled in the art will readily observe that numerous modifications and alterations may be made while retaining the teachings of the invention. For example, the second concave part 223 and the protruding edge 401 are not restricted to have specified shapes. In some embodiments, the protruding edge 401 is ring-shaped and the second concave part 223 is semi-circular. Moreover, as the dimension of the image pickup device 312 is incased, the dimensions of the external lens 40 and the protruding edge 401 need to be correspondingly increased. Under this circumstance, the shape of the second concave part 223 needs to be fitted with the shape of the protruding edge 401 of the external lens 40.

Figure 5:
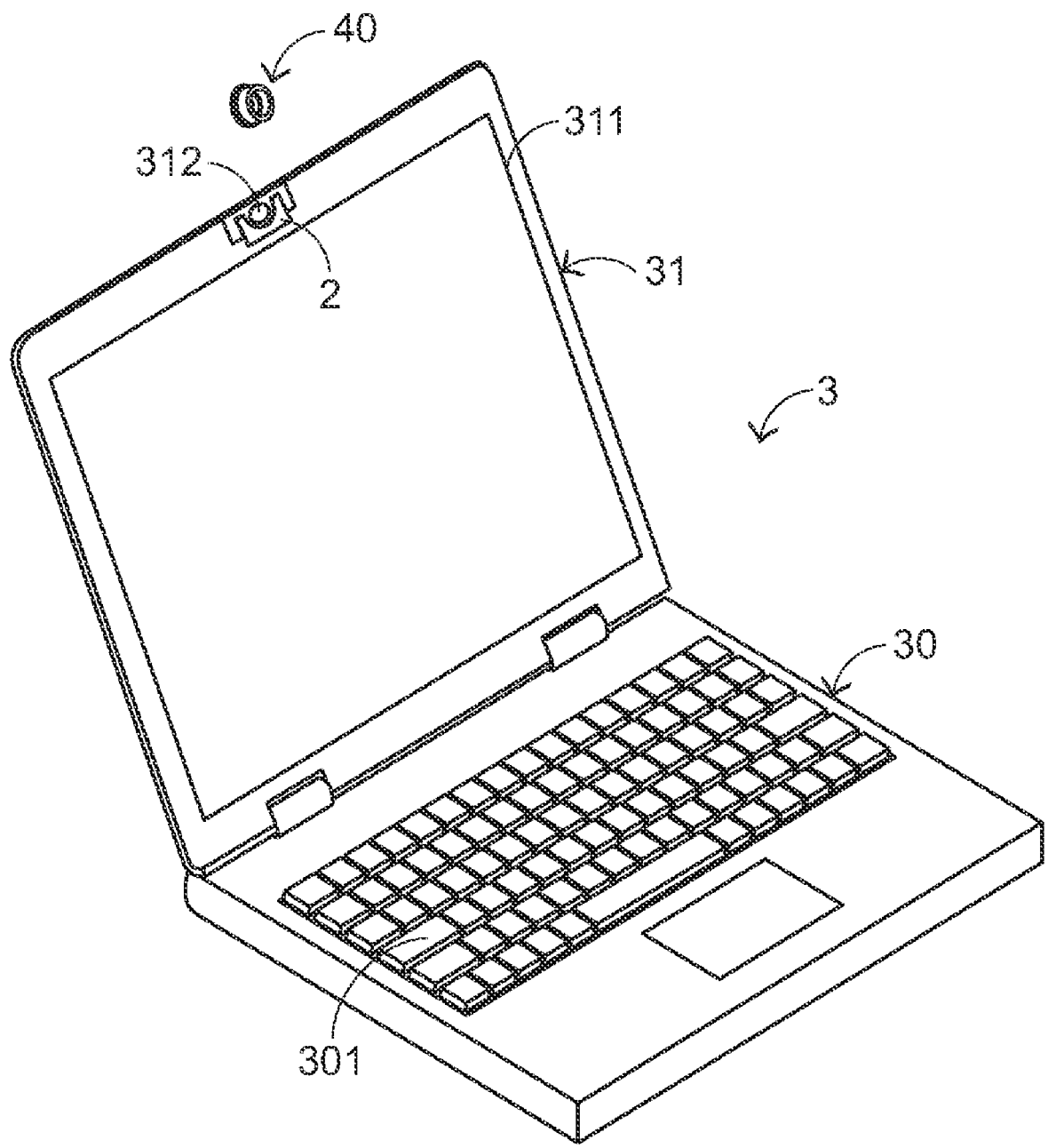
FIG. 5 is a schematic perspective view illustrating the relationship between the thin fastening slice module and the notebook computer according to the embodiment of the present invention.

Hereinafter, the connection between the thin fastening slice module 2 and the image pickup device 312 will be illustrated in more details with reference to FIG. 5. FIG. 5 is a schematic perspective view illustrating the relationship between the thin fastening slice module and the notebook computer according to the embodiment of the present invention. As shown in FIG. 5, the notebook computer 3 comprises a base 30 and an upper cover 31. Like the conventional notebook computer, a keyboard 301 is mounted on the base 30. Via the keyboard 301, the user may input characters or signs. The upper cover 31 comprises a screen 311 and an image pickup device 312. The image pickup device 312 is disposed on an upper edge of the upper cover 31. An example of the image pickup device 312 is a web camera. The other components of the notebook computer 3 are similar to those of the conventional notebook computer, and are not redundantly described herein.

For using the image pickup device 312, the thin fastening slice module 2 should be arranged in front of the image pickup device 312. That is, the second fastening slice body 22 of the thin fastening slice module 2 is connected to the front end of the image pickup device 312 but the first fastening slice body 21 is separated from the image pickup device 312. Under this circumstance, the recess structure 23 defined between the first fastening slice body 21 and the second fastening slice body 22 is next to the front end of the image pickup device 312, so that the recess structure 23 becomes a unidirectional gap. It is preferred that the thin fastening slice module 2 is connected to the front end of the image pickup device 312 via an adhesive (not shown). As a consequence, the thin fastening slice module 2 is arranged in front of the image pickup device 312 (see FIG. 5).

Figure 6:
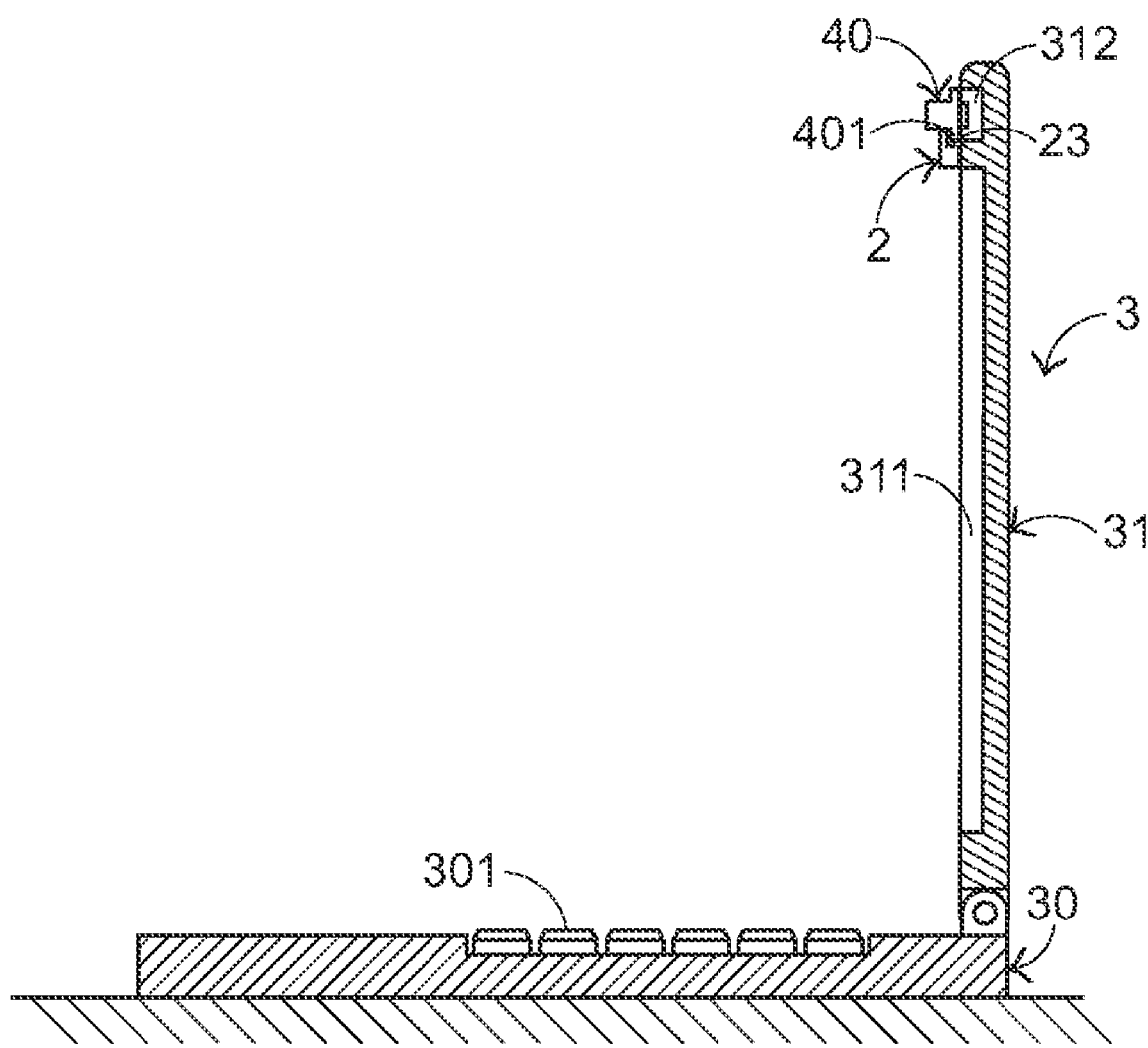
FIG. 6 is a schematic side view illustrating the notebook computer having the thin fastening slice module according to the embodiment of the present invention.

Next, the lower-half portion of the protruding edge 401 of the external lens 40 is embedded into the recess structure 23 of the thin fastening slice module 2. As such, the external lens 40 is fixed in the recess structure 23 of the thin fastening slice module 2 (see FIG. 6). Meanwhile, the image of the document could be captured by the image pickup device 312 and the external lens 40. In addition, the image of the document will be shown on the screen 311 of the notebook computer 3.

For enhancing the toughness and maintaining the light weight of the thin fastening slice module 2, the first fastening slice body 21 and the second fastening slice body 22 are made of Mylar. Due to the light weight of the thin fastening slice module 2, the thin fastening slice module 2 could be directly attached onto the front end of the image pickup device 312 of the notebook computer 3 via an adhesive. Due to the enhanced toughness of the thin fastening slice module 2, the thin fastening slice module 2 is sufficient to withstand the weight of the external lens 40.

From the above description, the thin fastening slice module of the present invention could be directly arranged at the front end of an image pickup device because the thin fastening slice module is small and light. Due to the thin thickness of the thin fastening slice module, the upper cover of the notebook computer could be opened or closed as required. That is, the operations of the image pickup device are not hindered by the thin fastening slice module that is arranged in front of the image pickup device. Even if the thin fastening slice module is not used, the thin fastening slice module needs not to be detached from the front end of the image pickup device. As a consequence, the user needs not additionally carry the thin fastening slice module. In a case that the image pickup device is a web camera of the notebook computer (see FIG. 5), the thin fastening slice module and the notebook computer are simultaneously carried by the user. Under this circumstance, the efficacy of the thin fastening slice module is more apparent. Moreover, since the thin fastening slice module of the present invention has a simplified structure, the process of producing the thin fastening slice module is simplified and cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A thin fastening slice module connected to a front end of an image pickup device for fastening an external lens, said thin fastening slice module comprising:
   a first fastening slice body including a first surface, a first upper periphery and a first concave part, wherein said first concave part is downwardly extended from said first upper periphery; and
   a second fastening slice body including a second surface, a second upper periphery and a second concave part, wherein said second concave part is downwardly extended from said second upper periphery, said first surface has an area greater than said second surface, said first upper periphery is aligned with said second upper periphery,
   wherein said second fastening slice body is connected to said front end of said image pickup device, and said first fastening slice body is separated from the image pickup device, so that a recess structure is defined between said first fastening slice body, said second fastening slice body and said image pickup device for fastening said external lens,
   wherein said external lens has a protruding edge at an outer periphery thereof, and said protruding edge is partially embedded into said recess structure, thereby fastening said external lens.

2. The thin fastening slice module according to claim 1 wherein said protruding edge has a shape fitted to said second concave part.

3. The thin fastening slice module according to claim 2 wherein said protruding edge is ring-shaped and the second concave part is semi-circular.

4. The thin fastening slice module according to claim 2 wherein said protruding edge and said second concave part have polygonal shapes.

5. The thin fastening slice module according to claim 1 wherein said first fastening slice body and said second fastening slice body have similar shapes, and said first concave part is smaller than said second concave part.

6. The thin fastening slice module according to claim 1 wherein said thin fastening slice module is connected with said image pickup device via an adhesive.

7. The thin fastening slice module according to claim 1 wherein said second fastening slice body is connected with said first fastening slice body via an adhesive.

8. A thin fastening slice module connected to a front end of an image pickup device for fastening an external lens, said thin fastening slice module comprising:
   a first fastening slice body including a first surface, a first upper periphery and a first concave part, wherein said first concave part is downwardly extended from said first upper periphery; and
   a second fastening slice body including a second surface, a second upper periphery and a second concave part, wherein said second concave part is downwardly extended from said second upper periphery, said first surface has an area greater than said second surface, said first upper periphery is aligned with said second upper periphery,
   wherein said second fastening slice body is connected to said front end of said image pickup device, and said first fastening slice body is separated from the image pickup device, so that a recess structure is defined between said first fastening slice body, said second fastening slice body and said image pickup device for fastening said external lens,
   wherein said external lens is a close-up lens for shortening a focal length of said image pickup device.

9. The A thin fastening slice module connected to a front end of an image pickup device for fastening an external lens, said thin fastening slice module comprising:
   a first fastening slice body including a first surface, a first upper periphery and a first concave part, wherein said first concave part is downwardly extended from said first upper periphery; and
   a second fastening slice body including a second surface, a second upper periphery and a second concave part, wherein said second concave part is downwardly extended from said second upper periphery, said first surface has an area greater than said second surface, said first upper periphery is aligned with said second upper periphery, wherein said second fastening slice body is connected to said front end of said image pickup device, and said first fastening slice body is separated from the image pickup device, so that a recess structure is defined between said first fastening slice body, said second fastening slice body and said image pickup device for fastening said external lens, wherein said image pickup device is a web camera of a notebook computer, wherein said notebook computer further comprises:

a base having a keyboard for inputting characters or signs; and an upper cover having a screen for displaying an image of a document, wherein said image pickup device is disposed on an upper edge of said upper cover.

10. The thin fastening slice module according to claim 1 wherein said first fastening slice body and said second fastening slice body are made of Mylar.

* * * * *